LONGITUDINAL POSITIONING OF A PHONOGRAPH STYLUS ASSEMBLY

Original Filed July 30, 1962

INVENTOR:
WILLIAM A. CAVAGNARO,

BY Norman C. Fulmer
HIS ATTORNEY.

INVENTOR:
WILLIAM A. CAVAGNARO,
BY Norman C. Fulmer
HIS ATTORNEY.

United States Patent Office 3,438,637

Patented Apr. 15, 1969

3,438,637

LONGITUDINAL POSITIONING OF A PHONOGRAPH STYLUS ASSEMBLY

William A. Cavagnaro, Greece, N.Y., assignor to General Electric Company, a corporation of New York Continuation of application Ser. No. 477,647, July 26, 1965, which is a continuation of application Ser. No. 213,355, July 30, 1962. This application Nov. 7, 1965, Ser. No. 600,327

Int. Cl. G11b *3/06, 3/04*

U.S. Cl. 274—37 3 Claims

ABSTRACT OF THE DISCLOSURE

A combination of a phonograph cartridge and a replaceable styli assembly, where the assembly is accurately positioned longitudinally by the selective cooperation of a lever arm of the styli assembly with a pair of slots formed in the cartridge housing.

This invention relates to phonograph pickup cartridges of the type having a rotatable stylus assembly attached thereto, and particularly relates to an arrangement for providing proper longitudinal positioning of the stylus assembly with respect to the cartridge.

The present invention is a continuation of my co-pending application Ser. No. 477,647, filed July 26, 1965, for Longitudinal Positioning of a Phonograph Stylus Assembly. The aforesaid application Ser. No. 477,647 was a continuation of my earlier copending application Ser. No. 213,355, filed July 30, 1962 for the same title. Both of these earlier filed applications have now become abandoned.

The type of pickup cartridge and stylus assembly to which the invention is directed, comprises a housing containing one or more transducer elements. A rotatable barrel member is seated at the underside of the housing and is adapted to be manually rotated over a 180° angle about its central axis by means of a lever arm extending laterally therefrom. A drive rod is attached at its rear end to the barrel member and extends forwardly of, and along the axis of, the barrel member. This drive rod thus rotates with the barrel member. Two needles or styli are attached to the drive rod at its front end and extend laterally therefrom in opposite directions, so that one stylus extends downwardly in playing position when the lever arm is positioned to extend to one side of the cartridge, and the other stylus extends downwardly in playing position when the lever arm is positioned to extend to the other side of the cartridge. A coupler member is arranged to mechanically couple the drive rod to the transducer elements of the cartridge.

Various means previously have been employed to provide longitudinal positioning of the stylus assembly with respect to the cartridge housing. One such means requires the provision of shoulders in the housing member which restrict the longitudinal movement of the barrel when properly seated in a recess in the housing member. Another such means requires a positioning member attached to the housing and adapted to engage an annular recess provided on the barrel member. Such expedients require a close-tolerance fitting of the barrel member to the cartridge housing, resulting in some difficulty in manufacturing the parts, and the longitudinal positioning shoulders or grooves at the barrel cause difficulty in replacing the stylus assembly.

An object of the invention is to provide an improved combination of a phonograph cartridge and stylus assembly therefor.

Another object is to provide a combination of a phonograph cartridge and stylus assembly therefor, having a new arrangement for longitudinal positioning of the stylus assembly with respect to the cartridge housing.

A further object is to provide a combination of a phonograph cartridge and replaceable stylus assembly therefor, in which the stylus assembly is easily replaceable.

Still other objects will be apparent from the following disclosure and claims, and from the drawing in which:

Figure 1:
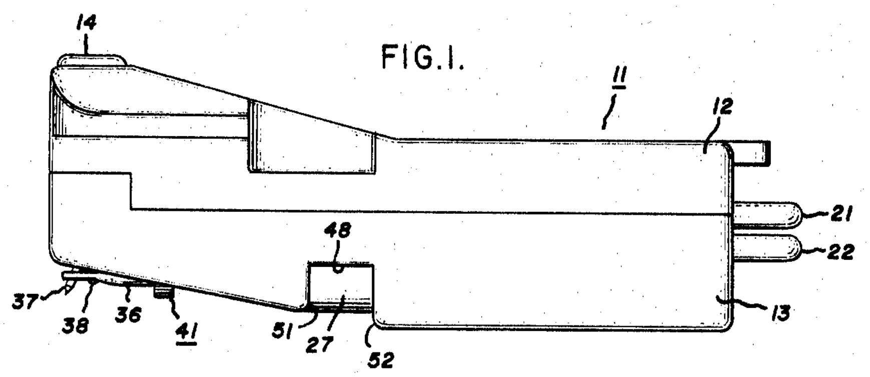
FIG. 1 is a side view of a phonograph pickup cartridge in accordance with a preferred embodiment of the invention.
Figure 2:
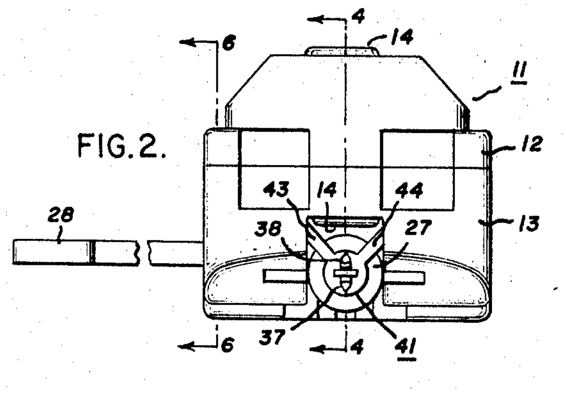
FIG. 2 is a front view of FIG. 1.

The cartridge and stylus assembly combination of the invention comprises, basically and in its preferred embodiment, a phonograph cartridge housing having seating means thereon for a cylindrical barrel member of a stylus assembly, a stylus assembly barrel member seated at said seating means so as to be rotatable about its axis, a lever arm extending transversely from the barrel member and adapted to rotate the barrel member from one operating position to another, and slots in the housing member to accommodate the lever arm at its operating positions, these slots being only slightly wider than the width of the lever arm so as to provide longitudinal positioning of the stylus assembly with respect to the cartridge housing when the barrel member is in either of its operating positions. The invention further comprises the shaping of one or both of the lever arm and housing slots to provide a tapering or curvature with respect to one another to facilitate entry of the lever arm into the slots.

The cartridge and stylus assembly combination shown in the drawing, is of the stereophonic type having a pair of ceramic transducer elements for converting the vibrations or undulations of a record groove into electrical signals, and comprises a housing 11 which may be composed of an upper part 12 and a lower part 13 attached together by means of rivets 14. The interior of the housing 11 is partly hollow, and contains a pair of elongated ceramic transducer elements 16 and 17, arranged mutually parallel and attached to the housing 11 at the rear end thereof by suitable means such as resilient blocks 18. The transducer elements 16 and 17 preferably are in the shape of flat bars, as shown, and are provided with metallic electrodes (not shown) deposited or attached to their flat surfaces, and suitable connecting wires (not shown) extend from these electrodes to terminal pins 21–24 at the rear of the cartridge housing 11.

A stylus assembly 26 comprises a barrel member 27 seated at or in the underside of the housing 11, and adapted to rotate 180° about an axis parallel to the general axis of the housing 11. The barrel 27 is manually rotatable by means of a lever arm 28 which extends laterally therefrom and is long enough to extend beyond the sides of the housing 11. To facilitate the seating of the barrel member 27 against the underside of the cartridge housing 11, the housing 11 is provided with a curved seating region 29 into which the barrel member 27 fits for rotation with respect to the housing 11. The barrel member 27 is flattened at opposite sides thereof as indicated at 31 and 32, and a spring clip 33 is arranged to ride against the barrel member 27 so as to engage against the flattened portions 31, 32 alternatively when the barrel is at the two extremes of its 180° rotation as determined by which side of the housing 11 the arm 28 extends from. An end of the clip 33 is attached to the housing 11, by screws, or by fitting into a slot in the housing, or by other suitable means.

An elongated drive rod or tube 36 is concentric with, carried by, and extends axially forwardly of, the barrel 27, as shown. The front end of the drive rod 36 is provided with two styli 37 and 38, arranged on opposite sides of the drive rod 36 and extending laterally therefrom, so that when the barrel 27 is in one of its two extreme rotary positions, one of the styli 37 will extend downwardly in record playing position, and when the barrel 27 is in its other extreme rotary position, the other stylus 38 will extend downwardly in record playing position. A convenient way to attach the styli 37, 38 to the drive rod 36 is to flatten the front end of the drive rod 36, as shown, and drill holes at suitable angles into the flattened front end of the drive rod into which the styli 37, 38 may be inserted and held by means of an adhesive or cement.

A V-shaped coupler 41, which may be made of suitable resilient material, connects the drive rod 36 to the two transducer elements 16, 17, as shown, by means of the coupler legs 43, 44.

Figure 3:
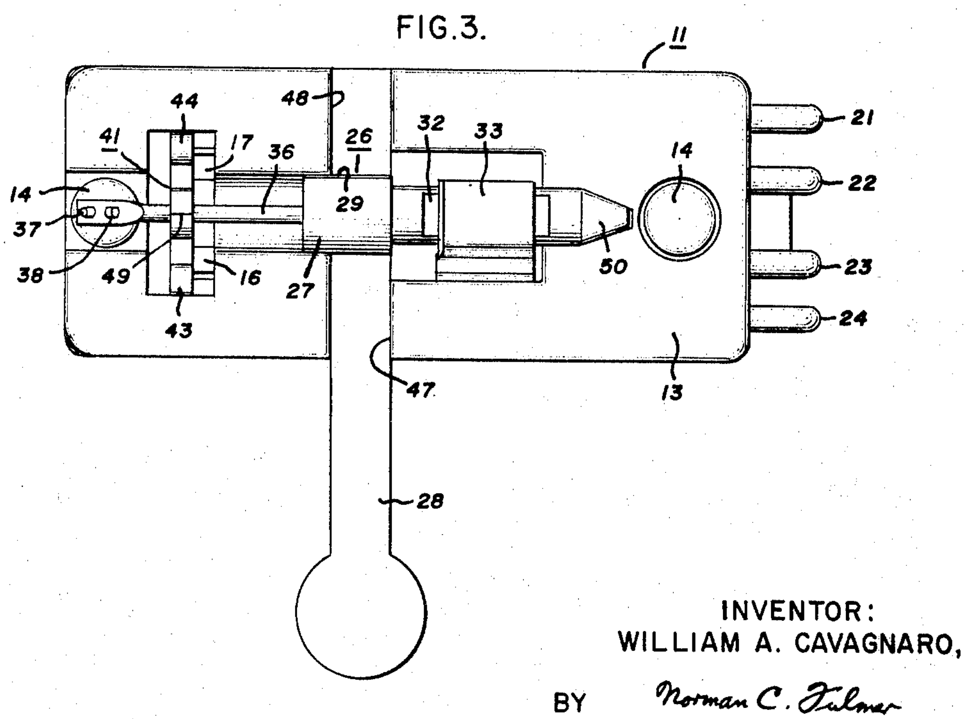
FIG. 3 is a bottom view of FIG. 1.
Figure 4:
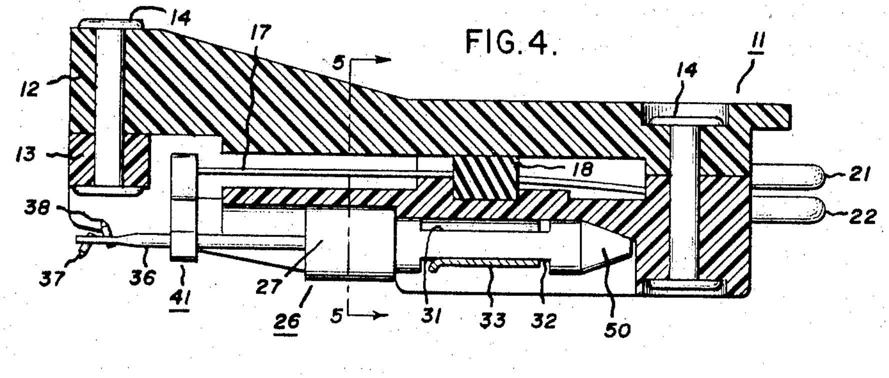
FIG. 4 is a cross-sectional view taken on the line 4—4 of FIG. 2.
Figure 5:
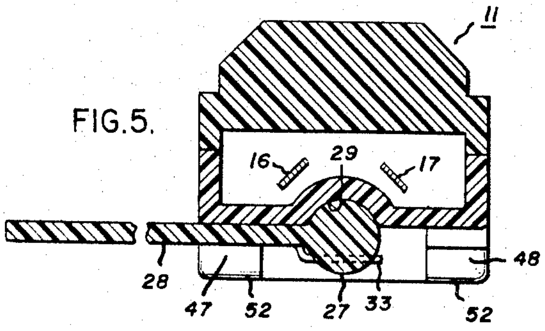
FIG. 5 is a cross-sectional view taken on the line 5—5 of FIG. 4.

The curved barrel-seating region 29, and the barrel 27, are contained in a recess 46 (FIG. 3) provided in the underside of the housing 11, and slots 47, 48 are provided in the housing 11, respectively, in the sides of the recess 46, whereby the lever arm 28 enters into the slots respectively at the two extremes of its positioning, so as to be rotatable over an angle of 180°. The rotational limits of the lever arm 28 are determined by its seating against the bottoms of the slots 47, 48.

In accordance with the present invention, the slots 47 and 48 are only slightly wider than the width of the lever arm 28, so that when the lever arm 28 is in either one of these slots, the lever arm, and hence the barrel 27 and the entire stylus assembly 26, is properly positioned longitudinally with respect to the cartridge housing 11. Thus, there is no need to provide shoulders or annular grooves in the barrel or its seating region for achieving longitudinal fitting of the barrel 27 into the barrel seating region 29.

The structure of the invention provides for easy removal of the stylus assembly from, and insertion into, the cartridge, as follows. To remove, the lever arm 28 is turned midway of its two operating positions, so that it extends downwardly from the cartridge. The clip 33 now is not in either of the flattened portions 31, 32 of the barrel, and hence the stylus assembly can be slid forwardly, by pulling forwardly on the lever arm, easily and with no hampering by any slots or shoulders of the stylus assembly or housing. When the forwardly moving barrel 27 engages against the coupler 41, the coupler becomes bent and the drive rod slips out of engagement with the coupler, via a slit 49 in the coupler between the opening for the drive rod and the bottom exterior extremity of the coupler. The stylus assembly is then free of the housing 11. Alternatively, when the barrel 27 engages the coupler 41, enough of the barrel 27 has been removed from under the spring slip 33 so that the stylus assembly can be tilted downwardly at its front end, by pulling downwardly on the lever arm 28, to slide the drive rod through the slit and out of engagement from the coupler 41, whereby the barrel 27 readily slips out from under the spring clip 33 and the stylus assembly is then free of the housing 11. An advantage of the invention is the fact that, due to the forward sliding of the stylus assembly for removal, the drive rod is in the coupler at a point of the drive rod near the barrel 27, so that its removal from the coupler does not incur any great leverage or force on the drive rod which could unduly bend or distort the drive rod.

To insert the stylus assembly, it is slid backwardly to seat the barrel 27 in the seating region 29 under the clip 32, and the drive rod is then pressed through the slip 49 and into position in the coupler 41. The lever arm 28 is then turned into one of the slots 47, 48 to bring the desired one of the styli 37, 38 into operating position and to insure proper longitudinal positioning of the stylus assembly. The rear end of the barrel 27 may be tapered in a conical manner, as indicated by the numeral 50, to facilitate insertion of the barrel into position under the spring clip 33.

Figure 6:
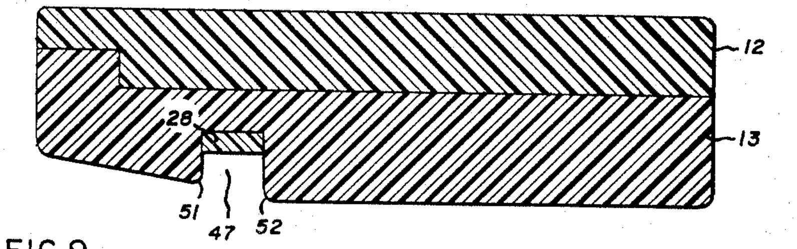
FIG. 6 is a cross-sectional view taken on the line 6—6 of FIG. 2.

It will be evident that when the lever arm 28 is being manually turned from one operating position to the other, and is out of engagement with both of the slots 47, 48, there is nothing securely holding it in proper longitudinal position; however, it is found that there is only a very slight tendency for the barrel member to ride in a longitudinal direction while the lever arm 28 is being changed from one slot 47 to the other slot 48, or vice versa. To take care of any slight tendency for longitudinal movement of the stylus assembly when being changed from one operating position to the other, and in accordance with a further feature of the invention, one or both of the lever arm 28 or the slots 47, 48, are rounded or tapered to facilitate entry of the lever arm 28 into the slots 47, 48. As shown in FIGS. 1 and 6, in a preferred embodiment of the invention, the entrance edges of the slots 47 and 48 are slightly rounded as indicated at 51 and 52, so that if the barrel 27 should move slightly longitudinally as it is being rotated by means of the lever arm 28, the lever arm 28 can readily enter into the slot, and, while entering the slot, will be shifted longitudinally to the correct longitudinal position.

Figure 7:
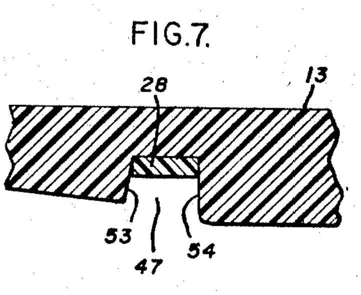
FIGS. 7–10 are views taken similar to FIG. 6, showing modifications of the invention.

FIGS. 7–10 show alternative ways of providing a relative slope or taper of the lever arm 28 with respect to the slots 47, 48. In FIG. 7, the side walls 53, 54 of the slots are tapered, as shown, so the slots are wider at their open ends than is the width of the lever arm 28, and the bottom of the slot has a width only slightly wider than the width of the lever arm 28. Thus, the lever arm 28 can readily enter the slots even though it may be slightly off from its normal longitudinal position, and will properly enter the slot and assume the correct longitudinal position when seated at the bottom of the slot.

Figure 8:
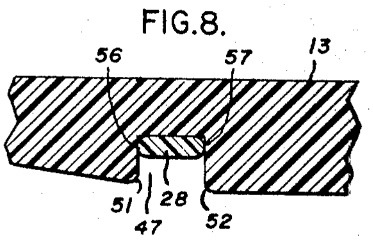

In the modification of FIG. 8, the slots are provided with mutually parallel sides, and do not need, but may have, rounded outer edges 51 and 52. Both edges of the lever arm 28, in this modification, are rounded as indicated at 56 and 57, thus providing the relative taper of the lever arm with respect to the slots, in accordance with the invention.

Figure 9:
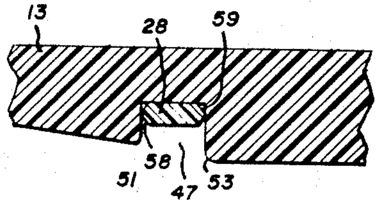

The modification shown in FIG. 9 is similar to that of FIG. 8, except that both edges of the lever arm 28 are beveled from both sides of the lever arm, as shown, instead of being rounded as in FIG. 8, the beveling of the lever arm edges from both sides thereof being indicated by the numerals 58 and 59.

Figure 10:
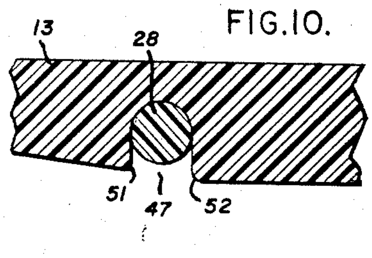

In the modification shown in FIG. 10, the lever arm 28 is provided with a circular cross-section, which inherently provides a taper on both sides of the lever arm with respect to the slots 47 and 48, thereby facilitating entry of the lever arm 28 into the slots 47 and 48, in accordance with a feature of the invention.

It has been found that the invention provides a combination of a phonograph pickup cartridge and a stylus assembly of the type adapted to be rotated with respect to the cartridge housing, which is relatively simple and inexpensive to manufacture, and which provides reliable and exact longitudinal positioning of the stylus assembly with respect to the cartridge housing when the stylus assembly is in an operating position, and which also permits easy removal of the stylus assembly from, and insertion into, the cartridge, thereby facilitating replacement of the stylus assembly.

While a preferred embodiment and modifications of the invention have been shown and described, various other embodiments and modifications thereof will be apparent to those skilled in the art, and will fall within the scope of the invention.

What I claim is:

1. A phonograph pickup cartridge and stylus assembly therefor, said cartridge comprising a housing and a stylus assembly removably located in said housing, said stylus assembly including a barrel member, a manually operable lever arm extending laterally from said barrel member, and a stylus carrying drive rod extending axially frontwardly of said barrel member, said cartridge housing including a seating region for receiving said barrel member and a pair of slots disposed at opposite sides of said seating region for selectively receiving said lever arm, said seating region being constructed and arranged to accommodate said barrel member and allow rotation of said barrel member in response to movement of the lever arm about the axis of said barrel member from a first operative position in which the lever arm extends to one side of the cartridge, to a second operative position in which the lever arm extends to the other side of the cartridge, said seating region including an opening in the front end thereof of sufficient cross-sectional magnitude to allow the barrel member of said stylus assembly to pass therethrough when said barrel member is moved in the direction of the axis of rotation of said barrel member, a spring clip means attached to said housing and adapted to resiliently retain said barrel member seated in said seating region, two flattened regions disposed on said barrel member to be alternatively engaged by said spring clip when said stylus assembly is in said operative positions, at least one transducer element positioned in said housing, a coupler arranged to removably interconnect said transducer and said drive rod, said cartridge slots being only slightly wider than the width of said lever arm so that said lever arm is contiguously cooperable with one of said slots for each of said operative positions thereby to positively and precisely position said stylus assembly longitudinally with respect to said housing when said stylus assembly is in an operative position, whereby said barrel member of said stylus assembly is able to pass through the opening in the front end of said cartridge seating region when said lever arm is rotated out of engagement with said slots, thereby to enable said stylus assembly to be readily removed from said cartridge by sliding said stylus assembly forward from its seated position after disengagement of the lever arm from said slots.

2. An arrangement as claimed in claim 1, in which the rear end of said barrel member is provided with a conical taper.

3. A phonograph pickup cartridge and stylus assembly therefor, said cartridge comprising a housing and a stylus assembly removably located in said housing, said stylus assembly including a barrel member, a manually operable lever arm extending laterally from said barrel member, and a stylus carrying drive rod extending axially frontwardly of said barrel member, said cartridge housing including a seating region for receiving said barrel member and a pair of slots disposed at opposite sides of said seating region for selectively receiving said lever arm, said seating region being constructed and arranged to accommodate said barrel member and allow rotation of said barrel member in response to movement of the lever arm about the axis of said barrel member from a first operative position in which the lever arm extends to one side of the cartridge, to a second operative position in which the lever arm extends to the other side of the cartridge, said seating region including an opening in the front end thereof of sufficient cross-sectional magnitude to allow the barrel member of said stylus assembly to pass therethrough when said barrel member is moved in the direction of the axis of rotation of said barrel member, detent means associated with the cartridge housing and the barrel member for resiliently retaining said barrel member seated in said seating region, said detent means including a housing detent region, a pair of oppositely disposed barrel detent regions and a resilient element, said resilient element being arranged to coact between said housing detent region and said barrel detent regions to alternatively retain said barrel member in engagement with said seating region when said stylus assembly is in either one or the other of said operative positions, at least one transducer element positioned in said housing, a coupler arranged to removably interconnect said transducer and said drive rod, said cartridge slots being only slightly wider than the width of said lever arm so that said lever arm is contiguously cooperable with one of said slots for each of said operative positions thereby to positively and precisely position said stylus assembly longitudinally with respect to said housing when said stylus assembly is in an operative position, whereby said barrel member of said stylus assembly is able to pass through the opening in the front end of said cartridge seating region when said lever arm is rotated out of engagement with said slots, thereby to enable said stylus assembly to be readily removed from said cartridge by sliding said stylus assembly forward from its seated position after disengagement of the lever arm from said slots.

References Cited

UNITED STATES PATENTS 2,848,559 8/1958 Palo ............. 179—100.41

FOREIGN PATENTS 1,090,442 10/1960 Germany.

LEONARD FORMAN, *Primary Examiner.*

F. J. D'AMBROSIO, *Assistant Examiner.*